SUBSCRIBER'S EQUIPMENT IN AN ELECTRONIC SWITCHING SYSTEM

Filed April 1, 1964 3 Sheets-Sheet 2

United States Patent Office 3,366,746
Patented Jan. 30, 1968

3,366,746
SUBSCRIBER'S EQUIPMENT IN AN ELECTRONIC SWITCHING SYSTEM

Floreal Amo Gracia, Paris, and Jacques Georges Dupieux, Issy-les-Moulineaux, France, assignors to International Standard Electric Corporation, New York, N.Y., a corporation of Delaware Filed Apr. 1, 1964, Ser. No. 356,484
Claims priority, application France, Apr. 18, 1963, 931,967, Patent 1,363,982
8 Claims. (Cl. 179—78)

ABSTRACT OF THE DISCLOSURE

A subscriber's station for an electronic switching system having no inductive components therein. The central office feeds current to the subscriber line in a manner which prevents crosstalk. To facilitate the transmission of such a current, a split load inverting transistor is connected across the line in the subscriber station.

The present invention concerns the circuits employed in an electronic switching system for subscriber's equipment and line circuits not containing inductive elements.

In the following description of the invention, the term "subscriber's equipment" will be used to designate the assembly of circuits allotted to each subscriber; each of these circuits including the subscriber's set, the line equipment placed in a concentrator or a central office and the transmission line connecting these two elements.

In addition, the term "common circuits" is used to identify the concentrator or the central office where the line circuit is found.

Each subscriber's set comprises a combined microphone-receiver handset and a cradle switch which controls the position of a number of two-position contacts, one of these positions characterizing the condition "handset on hook" and the other, the condition "handset off hook."

A subscriber's equipment assures the transmission of the following signals:

(1) Message signals;

(2) Functional signals comprising supervisory signals (characterizing the condition "on hook" or "off hook"), dialing and ringing signals; and (3) D.C. power-supply for the subscriber's set.

The present invention concerns a subscriber's equipment in which the transmission line contains four wires, comprising a "transmitting line" connected to the microphone of the subscriber's set and a "receiving line" connected to the receiver.

The use of such a four-wire line permits, in comparison with a two-wire line, certain simplifications in the subscriber's set and in the line circuit. In fact:

The subscriber's set does not need local anti-sidetone devices;

The difficulty of a four-wire/two-wire connection in the line circuit is avoided;

During a conversation, voice signals, a supervisory signal, and a power supply current are simultaneously present in the subscriber's set. The use of a four-wire line permits the employment of separate lines for each of the two last signals. Furthermore, the transformers and inductances used generally in telephony equipment present a certain number of inconveniences: high initial price, large bulk, coupling by magnetic fields, etc.

The subscriber's equipment according to the present invention does not use any inductive elements and only utilizes low-frequency transistors, resistances and condensers.

The present invention has therefore as its object the realization of a four-wire subscriber's equipment without inductive elements.

Another object of the invention is to reduce to a minimum, in said equipment, the causes and the effects of cross-talk.

The present invention will be particularly described with reference to the accompanying drawings in which.

It is known that signals, generated by external sources, induce interfering signals—called "cross-talk"—into a two-wire transmission line, or pair, these signals being in phase in both wires. If the pair under consideration is placed in a cable containing a certain number of other pairs, the source of the cross-talk can be either exterior to the cable; or it can be constituted by one or more of the other pairs.

The cross-talk can be reduced in two ways: by reducing the causes of the coupling or by reducing the effects of the coupling.

The reduction of the causes of coupling is obtained, on the one hand, by a suitable construction of the cable—which is outside the scope of the present invention—and on the other hand, by balancing separately each of the lines so that it does not produce an interfering signal. Balancing consists of applying the line voltages to the two wires in a symmetrical manner with respect to the ground. The voltages on each wire are of equal amplitude.

The reduction of the effects of coupling, or "compensation," utilizes the particular property of making coupled signals in phase on the two wires of the line. After the line has been balanced, the voice and signalling waveforms are applied to the line via a circuit which delivers an output voltage equal to the algebraic sum of the signals received on the two wires of the line, thus ensuring the elimination of cross-talk signals.

Figure 1:
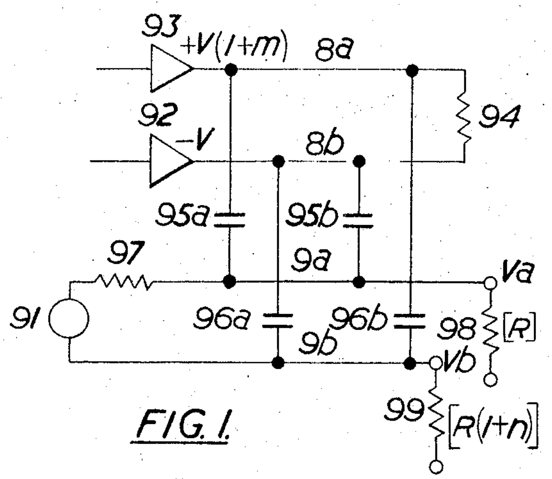
FIG. 1 represents the coupling between the two lines of a two-wire system.

FIG. 1 represents the coupling between two lines 8 (wires 8*a* and 8*b*) and 9 (wires 9*a* and 9*b*), imperfectly balanced.

It will be supposed that the line 9 is short, that its ohmic resistance is negligible as compared to the resistances 97, 98, 99, that there exist parasitic capacitances 95*a*, 95*b*, 96*a*, 96*b*, between the different wires of the two lines, and finally that these four capacitances are equal.

The interfering line 8 is not perfectly balanced so that, when the source 92 establishes on the conductor 8*b* a potential $-V$ with respect to the ground, the source 93 establishes a potential of opposite sign and of slightly differing amplitude $+V(1+m)$. The coefficient $m$ is a measure of the asymmetry of the interfering line.

In addition, the disturbed line 9, fed with voice signals by a source 91 of internal resistance 97, is not loaded in a symmetrical manner, the resistances 98 and 99 having as values respectively R and $R(1+n)$. The coefficient $n$ is a measure of the asymmetry of the loads.

The cross-talk voltage is defined as the difference $D=Va-Vb$ of the potentials at the right-hand extremity of the wires 9*a* and 9*b*. It will be noted that there has been represented only one resistance for the load 94 on line 8. This is perfectly admissible, since the coefficient $m$ takes into account possible load asymmetry on the interfering line.

Figure 2:
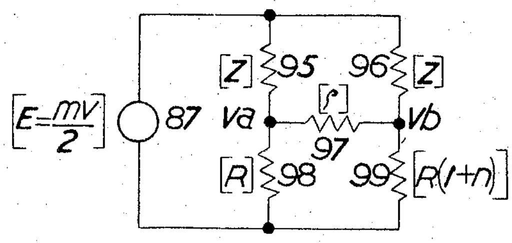
FIG. 2 represents the equivalent circuit of the coupling.

FIG. 2 represents the equivalent circuit of the coupling. In this circuit, the resistances 95 and 96 of value Z symbolize the resultant impedance of the parallel combination of capacitors 95a, 95b, and 96a, 96b. The resistance 97 of the generator for the disturbed line is referenced $\rho$.

The equivalent circuit is that of a Wheatstone bridge in which the cross-talk voltage is the potential difference $Va-Vb$ across the resistance 97.

If one puts $$a=\frac{Z}{R}$$

one has $$Va-Vb=\frac{mnV}{2}\cdot\frac{1}{(1+a)\left(1+\frac{2R}{\rho}+\frac{1}{a}\right)} \qquad (1)$$

If it is supposed that the levels of the useful signals are equal on the disturbing and on the disturbed lines, one can define a cross-talk factor T equal to the ratio of the cross-talk voltage induced onto a line to the useful voltage on the line. One has, then, from Equation 1:

$$T=\frac{mn}{2}\cdot\frac{1}{(1+a)\left(1+\frac{2R}{\rho}+\frac{1}{a}\right)}$$

The capacity between two wires of a cable is, for example, of the order of 20000 pf./km., so that for a length of 1 km. : $2C=40000$ pf. Consequently, at 800 c.p.s., one has: $Z=5000$ ohms.

If, for example, $R=500$ ohms and $\rho=3000$ ohms, one gets $$a=\frac{Z}{R}=10\,;\ \frac{1}{a}=0.1\,;\ \frac{2R}{\rho}=0.33$$

from which $$T=\frac{mn}{31.4}$$

If one chooses $m=n=0.03$; one has $T=2.87\times10^{-5}$, that is to say, the cross-talk level is 91 db below the signal level.

Finally, if the signal levels employed on the two lines are different, say $x$V on the disturbing line V on the distributed line, one sees that for $x=3$, for example, the level of the cross-talk increases by 10 db and changes, in the example given, from −91 db to −81 db.

Given that a level of intelligible cross-talk −80 db down is generally regarded as adequate for telephony, the value of 0.03 for $m$ and $n$ is admissible.

The figure $x=3$ corresponds to the most unfavorable case where a receiving line having a peak to peak level of 1.8 volt interferes with a transmitting line having a peak to peak level of 0.6 volt, the levels considered being those of speech and ringing signals.

Figure 3:
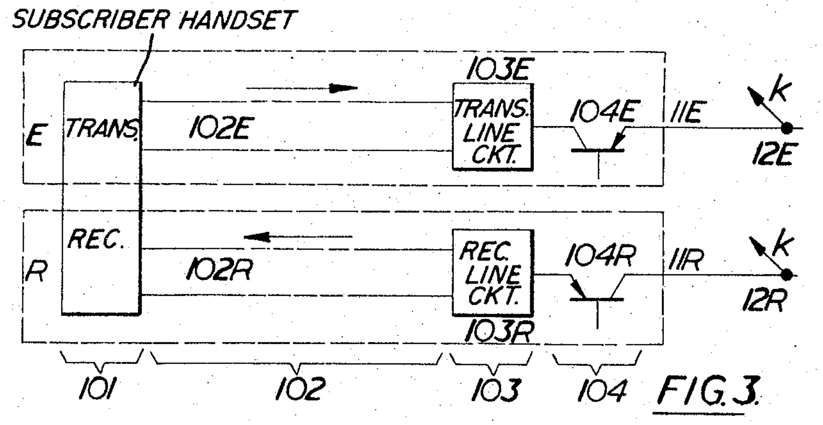
FIG. 3 is a general schematic of a subscriber's equipment for a four-wire system.

FIG. 3 represents a general scheme of a 4-wire subscriber's equipment, which comprises a "transmission side," referenced E, and a "reception side," referenced R.

This subscriber's equipment comprises:

- a subscriber's handset 101 comprising, in particular, a microphone, an earpiece and the contacts operated by the cradle switch;
- a transmitting line 102E and a receiving line 102R;
- a transmitting line circuit 103E and a receiving line circuit 103R;
- a transmitting PAM gate 104E and a receiving PAM gate 104R.

"PAM gate" is the name given to an electronic gate which, when activated, allows the amplitude of a signal, applied to its input, to be transmitted.

The gates shown in the figure are realized with PNP transistors and are "blocked" or "transmitting" according to the polarity of the voltage applied between the base and the input electrode.

Each of the subscriber's equipment contains two output leads 11E and 11R and, if $k$ sets are connected to common circuits, the $k$ conductors 11E and the $k$ conductors 11R are formed respectively into one conductor 12E and one conductor 12R.

If, for example, the telephone system considered functions in pulse-code modulation, the conductor 12E is connected to the input to the coder and the conductor 12R receives the signal delivered by the decoder. Time-multiplexing is carried out by activating, during the sampling time, the gates 104E and 104R of the line circuit affected, to the subscriber whose line must be connected, at this time, to the common circuits.

Figure 4:
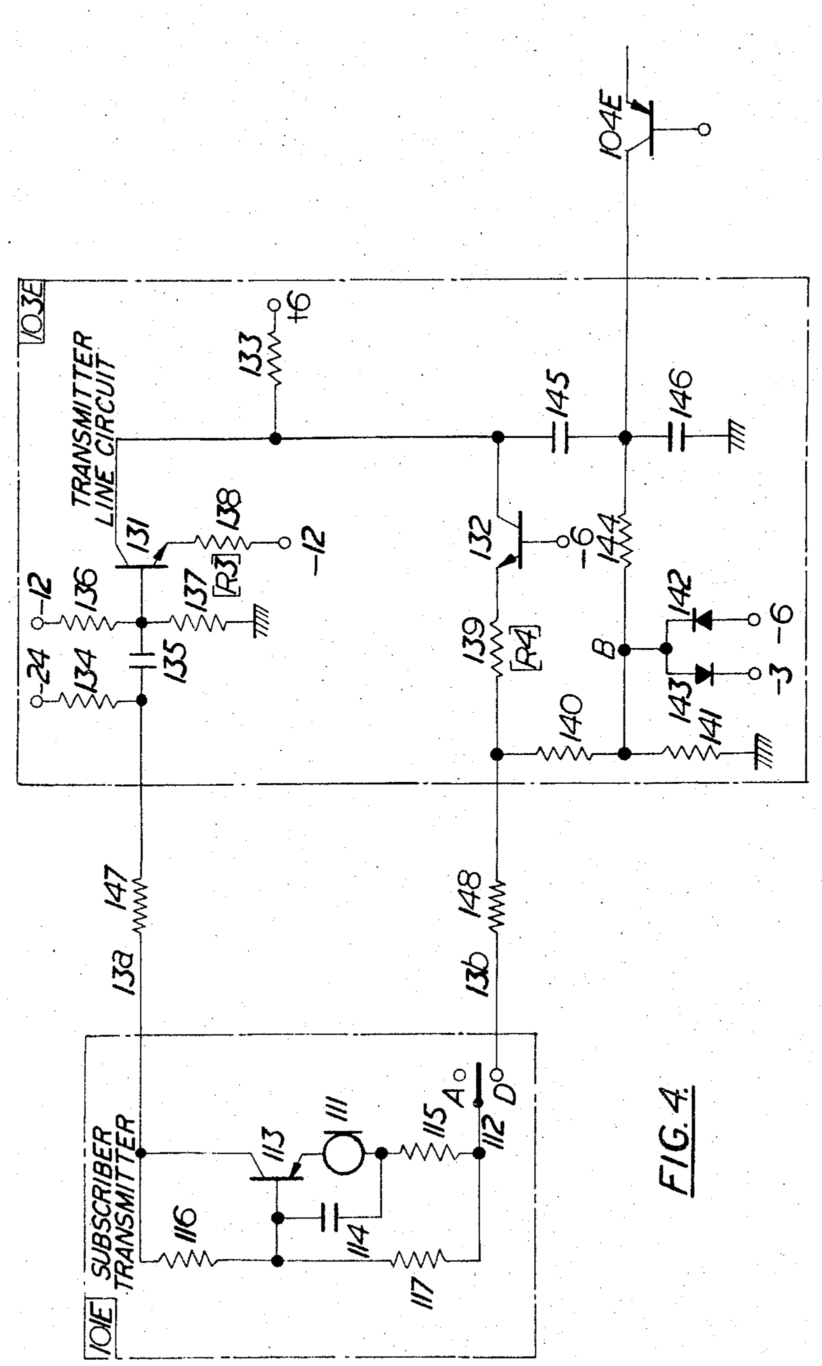
FIG. 4 represents a method of realization of the part of a subscriber's equipment associated with transmission.

FIG. 4 represents a way of realizing the subscriber's equipment associated with the transmitting side.

This carries out the following functions:

(1) Transmission of the speech signals between the microphone 111 of the set and the speech gate 104E;

(2) Transmission of supervisory signals, along with dialling signals, since these latter are produced by interruption of the line;

(3) Power feed for the microphone, if it is a carbon type.

The circuits must furthermore be balanced and ensure compensation for possible cross-talk induced on the line 102E (conductors 13a–13b).

The part 101E of the subscriber's set, used for the execution of the above described functions, comprises a carbon microphone 111, a switch 112, a split load inverter transistor 113, the capacitor 114 and the resistors 115, 116, 117. It will be noted that the resistance 115 is connected in series with the microphone 111 so as to reduce the direct current consumption and to mask the resistance variations of the microphone. The cradle switch 112 has two positions "A" and "D", which correspond respectively to the "on hook" and "off hook" conditions.

The output conductors 13a and 13b of the subscriber's set are connected to the line circuit 103E by means of the transmitting line 102E (FIGURE 3), of which the wires 13a and 13b have resistances 147 and 148.

This line circuit contains two transistors, the first connected in common-emitter configuration, and the second in common-base configuration, and a certain number of resistors and capacitors with which they are associated.

One will determine first the direct voltages present in this equipment when the handset is off hook, that is when the contact 112 is in position D.

The base of the transistor 113 is biased, in class A, by the resistances 116 and 117, which forms part of the resistance chain 134–147–116–117–148–140–141 connected between −24 volts and ground. The collector of transistor 113 is connected to the common point of resistances 116 and 147 and the network made up by the series connection of the microphone 111 and the resistance 115 is connected between the emitter of the transistor and the common point of the resistances 117 and 148. In addition, two diodes 142 and 143 are connected to the point B (the common point of the resistances 140 and 141) with the indicated polarities and are connected respectively to the potentials −6 v. and −3 v. Finally, the resistance 139 and the emitter-base junction of the transistor 132 are connected between the line 13b and the potential −6 v.

The resistances defining the potential of the point B are chosen in such a way that in the absence of the diodes 142 and 143, the said potential would be more negative than −6 v. In this condition, when the diodes are connected, the diode 143 is non-conducting and the diode 142 is conducting, maintaining the potential of point B at −6 v. The emitter-base junction of the transistor 132 is also conducting and the emitter is at a potential of about −6 v. It will be noted that the resistance 141 is short-circuited from the point of view of alternating signals; and that the resistances 139 and 140 are connected in parallel (the input impedance of the transistor 132 is low compared with the resistance 139 and can be ignored).

When the switch 112 is in the position A, a current flows from earth to −6 v., through the resistances 141, 140 and 139 and the emitter-base junction of transistor 132, which is always conducting. The potential of the point B is always negative but, if the resistances are so chosen that it is more positive than −3 v., the diode 143 becomes conducting and the potential is fixed at −3 v. The potential of point B changes therefore from −3 v. to −6 v. when the contact 112 changes from position A to position D. This variation of potential constitutes the supervisory signal indicating that the set is on hook or off hook. Furthermore, if signalling is carried by interrupting the line, it is possible to open at each dialling impulse, a contact placed in series with the contact 112. Dialling signals are therefore detected in the form of negative impulses.

The functioning of the subscriber set 101E is now described. For alternating current, the condenser 114, of which the capacitance is very high, forms a short-circuit so that the microphone 111 is connected between the base and the emitter of the transistor 113. Also for A.C., the resistance 117 is connected in parallel with resistance 115 and resistance 116 is between the base and collector of the transistor.

The loads in the emitter and collector of this transistor are determined as follows:

(a) The collector load R1 is composed of the series connection of the line resistance 147 and the equivalent impedance of the parallel combination of the following elements:

resistance 134;
resistances 136 and 137;
input impedance of the transistor 131 in the common-emitter connection is very high, with a strong negative feedback in the emitter. Since this impedance is very large, its effect on the total load is slight and can be neglected.

(b) The emitter load R2 is composed of the series connection of the line resistance 148 and the equivalent impedance of the parallel combination of the following elements:

resistance 140 (it will be recalled that, whatever may be the position of the switch 112, the resistance 141 is short-circuited by one of the diodes 142 or 143);
the impedance formed by the series connection of the resistance 139 and of the input impedance of transistor 132 in common-base connection. This impedance being very small, it may be neglected.

These loads R1 and R2 having a common point connected to earth for A.C., the same current Ic flows through them so that the voltages V1 and V2 at their ends are in phase opposition. These voltages are equal for $R1=R2$, which ensures balance of the line.

It will be noted that part of the output power is dissipated in the resistance 116.

One will now describe the operation of the amplifier constituted by the transistors 131 and 132, which are operated in class A and which are biased respectively by the resistance chain 136–137 and by the −6 v. supply.

Transistor 131 is connected in common-emitter configuration with an emitter resistance 138 of value R3. If $\alpha 1$ is its current gain for the common-base connection, its emitter current is $V1/R3$ and its collector current is $V1/R3.\alpha 1$.

Transistor 132 is connected in common-base configuration with an emitter resistance 139 of value R4. If one calls $\alpha 2$ its common-base current gain, its emitter current is $V2/R4$ and its collector current is $$\frac{V2}{R4}\cdot\alpha 2$$

The collectors of these two transistors are connected to the common load resistance 133 and cross-talk compensation will be achieved by the condition:

$$\frac{V1}{R3}\cdot\alpha 1=\frac{V2}{R4}\cdot\alpha 2$$

i.e., $$\frac{\alpha 1}{R3}=\frac{\alpha 2}{R4}$$

In order to obtain a level of asymmetry *m* less than 0.03, it is sufficient to define the resistances R1 and R2 with a precision of ±1.5%.

On the other hand, the induced cross-talk is not only a function of the asymmetry of the loads R1 and R2 (the factor *n* defined in the cross-talk study) but also of the tolerances of the resistances R3 and R4 and of the current gains $\alpha 1$ and $\alpha 2$ of the transistors 131 and 132. It is easy to calculate that, for a cross-talk level of −80 db. the tolerances on these elements must be very low.

Nevertheless, it is possible to equalize, on the one hand, the resistances R1 and R2, and on the other hand, the gains of the transistors 131 and 132, by adjusting, for each of these equalizations, the value of a resistance chosen in such a way as to not affect the other equalization.

Thus it is possible, for example, to adjust the load R1 without affecting the operation of the transistor 131 so that it is made equal to the resistance R2. In order to equalize the gains of the transistors, resistor R3 may be adjusted, the variation of which does not affect the value of the resistance R1. On the other hand, the resistance R4 cannot be adjusted, since it constitutes in parallel with the resistance 140 the load of the line **13*b***.

The line circuit which has just been described may be simplified by realizing a direct connection between the wire **13*a* and the base of the transistor 131, obtained by removing the resistance 134 and the condenser 135**.

The supply voltage supplied to the upper end of the resistance 136 and the value of this resistance are chosen to ensure the correct supply to the set 101E, and the resistance 138 is adjusted to obtain the required bias.

Figure 5:
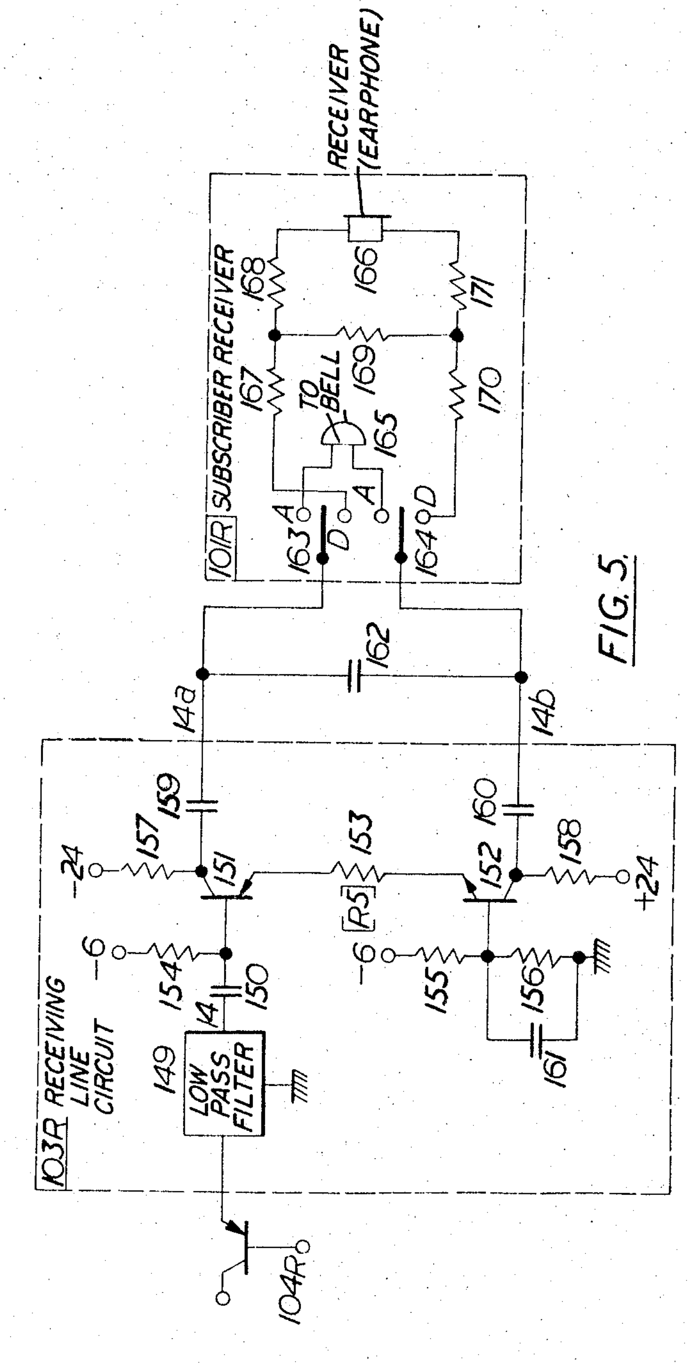
FIG. 5 represents a method of realization of the part of a subscriber's equipment associated with reception.

FIG. 5 represents the subscriber's equipment on the reception side. This equipment ensures the transmission of speech signals and ringing signals between the speech gate 104R and the reception part of the subscriber's set which comprises two receivers: the headphone 166 and the bell 165.

The amplitude modulated pulses delivered by the gate 104R are supplied to the line circuit 103R, which comprises a low-pass filter 149 delivering at its output demodulated signals. These are applied to a two transistor complementary symmetry differential amplifier comprising the transistors 151 and 152. The signals appearing on the collectors of these transistors are in phase opposition and are transmitted, on the wires **14*a* and 14*b* of the reception line, to the circuit 101R**.

This comprises the bell 165 and the headphone 166 fed across a symmetrical attenuator comprising the resistors 167 to 171, the energization of these receivers being controlled by the switches 163 and 164 associated with the cradle. Thus, with the switches in position A (on hook), the bell 165 is in circuit and when it is in position B (off hook), the headphone 166 is in circuit. The ringing and the speech signals transmitted from the exchange through the gate 104R, are amplified by the transistors 151 and 152 so that the ringing signals are at the level required to activate the bell, this level being clearly above that which should be applied to the headphone 166.

For this reason, a symmetrical attenuator has been inserted into the headphone circuit.

This attenuator also masks the reactive impedance of the headphone, and equalizes the load on the line for "on hook" and "off hook" conditions.

In the differential amplifier employed, it is possible to consider that the PNP transistor 151 is connected in common emitter configuration and that the NPN transistor 152 is connected in the common base mode, the condenser 161 holding the base at zero potential for alternating currents.

These two transistors are operated in class A, respectively by the resistance 154 and by the resistance chain 155–156. Their emitters are connected together by the resistance 153 (which is called R5) so that the emitter current of the transistor 151, which is in phase with its base current, is the drive current for transistor 152. The potential on the collector of this transistor is therefore in phase with the input current, whilst the voltage on the collector of transistor 151 is in phase opposition with this current. The line 14 is thus truly supplied in a symmetric manner.

One defines:

*hib* and *hie* the input impedances respectively of the transistors 152 and 151;
$\beta'$ and $\beta''$ the common emitter gains of the transistors 151 and 152;
$\alpha'$ and $\alpha''$ the common base gains of said transistors;
V3 the instantaneous alternating voltage delivered by the filter 149;
*ib* the base current of transistor 151;
*ie* the current circulating in the resistor 153;
*i'c and i''c* the respective collector currents of the transistors 151 and 152;
*Ze* the input impedance of the transistor 151.

The emitter impedance of transistor 151 being equal to R5 plus *hib*, one has $$ib=\frac{V3}{hie+(\beta'+1)(R5+hib)}=\frac{V3}{Ze}$$

Moreover $$ie=(\beta'+1)\frac{V3}{Ze}$$

and $$i'c=\beta'\frac{V3}{Ze}$$

$$i''c=\alpha''(\beta'+1)\frac{V3}{Ze}$$

If the loads connected to the wires 14*a* and 14*b* are supposed equal, the line will be balanced if $i'c=i''c$; that is $$\frac{\beta''}{\beta''+1}=\alpha''$$

Since $$\frac{\beta'}{\beta'+1}=\alpha'$$

the balance condition is: $\alpha'=\alpha''$.

The amplifier load is made up of the parallel connection of the three following impedances, the whole being connected between the collectors of transistors 151 and 152:

(a) The input impedance of the symmetrical attenuator or of the bell 165, these two impedances being of the same order of magnitude, as has been previously stated;

(b) Feed resistances 157 and 158, for the collectors, which are effectively connected in series from the A.C. point of view;

(c) Condenser 162 which symbolizes the capacity between the wires of the line 14*a* and 14*b*.

Given that parts *a* and *c* of the load are balanced with respect to earth, they do not cause asymmetry.

On the other hand, part *b* can bring unequal loads on to the two wires 14*a* and 14*b*. This asymmetry can be compensated by connecting a suitable condenser between earth and one of the wires.

While the principles of the above invention have been described in connection with specific embodiments and particular modifications thereof it is to be clearly understood that this description is made by way of example and not as a limitation of the scope of the invention.

We claim:

1. A telephone communication system comprising means for supplying direct current from a central office over a pair of wires to a subscriber, means in said subscriber set comprising a first transistor having input and output electrodes coupled across one end of said pair for delivering symmetrical signals of equal amplitude over each of the two wires of said pair, a pair of transistors each being individually coupled to one of the two wires in said pair, means in the central office comprising said pair of transistors for individually amplifying the signals received over each wire of said pair with said amplifying transistors acting as load impedances for said first transistor, and means for equalizing the current gains of said amplifying transistors to cancel in-phase cross-talk induced on both lines of said pair while conducting said symmetrical signals.

2. The system of claim 1 wherein the subscriber set includes a carbon microphone connected in series with a masking resistor and the emitter-collector of said first transistor, and the direction of said direct current on said pair of wires forwardly biases said first transistor to cause said transistor to behave as a split load inverter.

3. The system of claim 2 wherein the collector of said first transistor is connected directly to a first of said pair of wires and the emitter is connected through a series circuit including said microphone and said masking resistor to the other of said pair of wires, a two resistor voltage divider also coupled across said pair of wires with the junction of said divider coupled to the base of said first transistor, and a capacitor coupled between the emitter and the base of said first transistor, the capacitance of said capacitor presenting a low impedance to voice signals as compared with the impedance of said microphone, and the variational resistance of said microphone being low as compared with the resistance of said masking resistor.

4. A telephone subscriber station system comprising means for supplying direct current from a central office over a pair of wires to said station, means in said subscriber set comprising a first transistor having input and output electrodes coupled across one end of said pair for delivering symmetrical signals of equal amplitude over each of the two wires of said pair, a pair of transistors each being individually coupled to one of the two wires in said pair, means in the central office comprising said pair of transistors for individually amplifying the signals received over each wire of said pair with said amplifying transistors acting as load impedances for said first transistor, means for equalizing the current gains of said amplifying transistors to cancel in-phase cross-talk induced on both lines of said pair while conducting symmetrical signals on said pair, wherein one of said pair of amplifying transistors comprises a transistor in a common emitter configuration and the other of said amplifying transistors comprises a transistor in a common base configuration, each of said transistors having an unbypassed emitter resistor, and a common load resistor connected to the collector of each of said resistors.

5. The system of claim 4 wherein the ratio of the emitter resistors equals the ratio of the current gains of said pair of amplifying transistors.

6. A telephone subscriber station system comprising a pair of wires for coupling a central office to a subscriber station, means connected to one end of said pair in said central office for amplifying voice signals received by said subscriber station and means for delivering symmetrical signals over said pair of wires to said subscriber station, means on the other end of said pair of wires for connecting said pair to either a receiver or a called-subscriber-signal device responsive to the on-hook or off-hook condition of said station, and equalizing means connected in series with said pair of wires for equalizing the impedance of said receiver and device and attenuating voice signals to a level required by said receiver.

7. A telephone subscriber station system comprising a pair of wires for coupling a central office to a subscriber station, means connected to one end of said pair in said central office for amplifying voice signals received in said central office and delivering symmetrical signals over said pair of wires to said subscriber station, means on the other end of said pair of wires for connecting said pair to either a receiver or a called-subscriber-signal device responsive to the on-hook or off-hook condition of said station, equalizing means connected in series with said pair of wires for equalizing the impedance of said receiver and device and attenuating voice signals to a level required by said receiver, wherein said amplifier means comprises a pair of transistors of opposite polarity types, said transistors being connected in series to form a differential amplifier with one input terminal grounded, the emitter of said transistors being joined together by a common emitter resistance and the collectors being coupled to sources of equal voltages of opposite polarities via equal resistors.

8. A four-wire telephone subscriber station system comprising means for supplying direct current from a central office over a first pair of said four wires to said station, means in said subscriber set comprising a first transistor having input and output electrodes coupled across one end of said pair for delivering symmetrical signals of equal amplitude over the two wires of said pair, a pair of amplifying transistors each being individually coupled to one of the two wires of said first pair, means in the central office comprising said pair of amplifying transistors for individually amplifying the signals received over each wire of said first pair with said amplifying transistors acting as load impedances for said first transistor, means for equalizing the current gains of said amplifying transistors to cancel in-phase cross-talk induced on both lines of said pair while conducting said symmetrical signals on said pair, means connected to one end of a second pair of said four wires in said central office for amplifying symmetrical signals received through said central office and delivering said symmetrical signals over said second pair of wires to said subscriber station, means on the other end of said second pair of wires for connecting said second pair to either a receiver or a signal device responsive to the on-hook or off-hook condition of said station, and equalizing means connected in series with said pair of wires for equalizing the impedance of said receiver and device and attenuating voice signals to a level required by said receiver.

References Cited

UNITED STATES PATENTS

| | | | |
|---|---|---|---|
| 2,296,920 | 9/1942 | Goodale | 333—12 |
| 2,509,389 | 5/1950 | Blake | 179—78 |
| 2,696,526 | 12/1954 | Stieltjes | 179—78 |
| 2,734,944 | 2/1956 | Green | 333—12 |
| 3,230,315 | 1/1966 | Judy | 179—18 |

WILLIAM C. COOPER, *Primary Examiner.*

A. H. GESS, *Assistant Examiner.*